United States Patent
Peng et al.

(10) Patent No.: US 11,909,000 B2
(45) Date of Patent: Feb. 20, 2024

(54) LITHIUM-ION SECONDARY BATTERY, BATTERY MODULE, BATTERY PACK, AND POWERED DEVICE

(71) Applicant: CONTEMPORARY AMPEREX TECHNOLOGY CO., LIMITED, Ningde (CN)

(72) Inventors: Chang Peng, Ningde (CN); Peipei Chen, Ningde (CN); Hailin Zou, Ningde (CN); Chengdu Liang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/820,944

(22) Filed: Aug. 19, 2022

(65) Prior Publication Data

US 2022/0407115 A1    Dec. 22, 2022

Related U.S. Application Data

(63) Continuation of application No. PCT/CN2021/096742, filed on May 28, 2021.

(51) Int. Cl.
*H01M 4/505*  (2010.01)
*H01M 4/525*  (2010.01)
(Continued)

(52) U.S. Cl.
CPC ... *H01M 10/0568* (2013.01); *H01M 10/0525* (2013.01); *H01M 10/0567* (2013.01);
(Continued)

(58) Field of Classification Search
None
See application file for complete search history.

(56) References Cited

U.S. PATENT DOCUMENTS

| 10,636,582 B2 | 4/2020 | Kimura et al. |
| 2003/0003369 A1* | 1/2003 | Dai ............ H01M 10/0568 |
| | | 29/623.1 |

(Continued)

FOREIGN PATENT DOCUMENTS

| CN | 107623142 A | 1/2018 |
| CN | 108475584 A | 8/2018 |

(Continued)

OTHER PUBLICATIONS

International Search Report of application No. PCT/CN2021/096742, dated Jan. 27, 2022.

(Continued)

*Primary Examiner* — Carlos Barcena
(74) *Attorney, Agent, or Firm* — Ladas & Parry LLP

(57) ABSTRACT

A lithium-ion secondary battery is provided, where an electrolyte solution of the lithium-ion secondary battery comprises a highly heat-stable salt $(M^{p+})_{x/y}R_1(SO_2N^-)_xSO_2R_2$, where the $M^{p+}$ is a metal ion, $R_1$ and $R_2$ are each independently a fluorine atom, an alkyl with 1-20 carbon atoms, a fluoroalkyl with 1-20 carbon atoms, or a fluoroalkoxy with 1-20 carton atoms, x is 1, 2, or 3, and y is 1, 2, or 3. A mass percent of the salt in the electrolyte solution is set as k2%; a temperature rise coefficient k1 of the positive electrode sheet satisfies $2.5 \leq k1 \leq 32$, where k1=Cw/Mc, Cw is a positive electrode material load per unit area (mg/cm²) on the surface of any side of the positive electrode current collector on which a positive electrode material layer is loaded, and Mc is a carbon content (%) of the positive electrode material layer; and the lithium-ion secondary battery satisfies $0.34 \leq k2/k1 \leq 8$.

12 Claims, 2 Drawing Sheets

(51) Int. Cl.
*H01M 10/0568* (2010.01)
*H01M 10/0525* (2010.01)
*H01M 10/0567* (2010.01)
*H01M 4/02* (2006.01)

(52) U.S. Cl.
CPC .......... *H01M 4/505* (2013.01); *H01M 4/525* (2013.01); *H01M 2004/028* (2013.01); *H01M 2220/20* (2013.01); *H01M 2300/0025* (2013.01)

(56) References Cited

U.S. PATENT DOCUMENTS

| | | | |
|---|---|---|---|
| 2010/0015514 A1* | 1/2010 | Miyagi | H01M 50/46 429/129 |
| 2010/0099031 A1* | 4/2010 | Kato | H01M 10/0567 429/345 |
| 2018/0102570 A1* | 4/2018 | Koh | H01M 4/525 |
| 2018/0331393 A1* | 11/2018 | Cho | H01M 10/0568 |
| 2019/0027320 A1 | 1/2019 | Kimura et al. | |
| 2020/0219665 A1 | 7/2020 | Kimura et al. | |
| 2021/0043972 A1 | 2/2021 | Sugawara et al. | |
| 2021/0175546 A1 | 6/2021 | Doi et al. | |
| 2022/0271338 A1 | 8/2022 | Kamine et al. | |

FOREIGN PATENT DOCUMENTS

| | | |
|---|---|---|
| CN | 108767310 A | 11/2018 |
| CN | 111954952 A | 11/2020 |
| CN | 112736285 A | 4/2021 |
| JP | 2004511887 A | 4/2004 |
| JP | 2005174686 A | 6/2005 |
| JP | 2018081787 A | 5/2018 |
| WO | 2021049648 A1 | 3/2021 |

OTHER PUBLICATIONS

Written Opinion of application No. PCT/CN2021/096742, dated Jan. 27, 2022.
Extended European Search Report of EP application No. 21912316.3, dated Mar. 2, 2023.
Notice of Reasons for Refusal, JP Application No. 2022-548006, dated Jun. 5, 2023.

* cited by examiner

LITHIUM-ION SECONDARY BATTERY, BATTERY MODULE, BATTERY PACK, AND POWERED DEVICE

CROSS REFERENCE TO RELATED APPLICATION

This application is a continuation of International Patent Application No. PCT/CN2021/096742, filed on May 28, 2021, which is incorporated by reference in its entirety.

TECHNICAL FIELD

The present application relates to the field of lithium-ion secondary batteries, and particularly relates to a lithium-ion secondary battery with a high energy density, a battery module, a battery pack, and a powered device.

BACKGROUND

Characterized by low costs, long life, good safety, and the like, lithium-ion battery has become the most popular energy storage system and has now been widely used in the fields such as all-electric vehicles, hybrid electric vehicles, and smart grids. However, it is difficult for a current lithium-ion secondary battery to meet people's higher demand for range. To eliminate people's "range anxiety" about electric vehicles, it is urgent to develop a lithium-ion secondary battery with higher energy density.

The energy density can be effectively increased by increasing the discharge gram capacity of an active material per unit volume in a lithium-ion secondary battery. For example, by reducing a content of carbon as a conductive agent on an electrode sheet or a carbon coating amount on the surface of positive electrode material particles, the weight of an active material per unit volume is increased, thereby increasing the discharge gram capacity of the active material per unit volume. In addition, by increasing the coating weight of the active material and reducing the proportion of the inactive substrate used, the discharge gram capacity of the active material per unit volume can be further improved. However, the above strategy will lead to a significant increase in the internal resistance of the battery cell while achieving high energy density. When charging at a high rate, the battery cell releases heat seriously and are thus under high temperature conditions. In this case, decomposition of lithium salts, such as $LiPF_6$, in the electrolyte solution will be accelerated to generate gases such as HF and $PF_5$. These highly reactive ingredients will accelerate the damage of a SEI film, resulting in the exposure of the active material to the electrolyte solution, and resulting in the loss of the active material. A repair process of the SEI film will continuously consume active lithium and the electrolyte solution, resulting in further deterioration of the cycling performance and storage life of the battery cell.

Therefore, there is a need to improve the energy density of a lithium-ion secondary battery while ensuring the cycle and storage life of the battery cell.

SUMMARY

The present application is conducted in view of the above problem, and aims to provide a lithium-ion secondary battery, thereby solving the problem that a high-energy density cell generates a lot of heat during charging, which leads to the decomposition of electrolyte solution and poor cycle and storage life of the cell.

To achieve the above purpose, a first aspect of the present application provides a lithium-ion secondary battery having a positive electrode sheet, a negative electrode sheet, a separator, and an electrolyte solution, the positive electrode sheet comprising a positive electrode current collector and a positive electrode material layer arranged on at least one surface of the positive electrode current collector, the positive electrode material layer comprising a positive electrode active material and carbon, where the electrolyte solution comprises a lithium salt $(M^{p+})_{x/y}R_1(SO_2N^-)_xSO_2R_2$, where the $M^{p+}$ is a metal ion, $R_1$ and $R_2$ are each independently a fluorine atom, an alkyl with 1-20 carbon atoms, a fluoroalkyl with 1-20 carbon atoms, or a fluoroalkoxy with 1-20 carton atoms, the x is 1, 2, or 3, the y is 1, 2, or 3; and a mass percent of the lithium salt in the electrolyte solution is set as k2%;

a temperature rise coefficient k1 of the positive electrode sheet satisfies $2.5 \leq k1 \leq 32$, where k1=Cw/Mc, Cw is a positive electrode material load per unit area (mg/cm$^2$) on the surface of any side of the positive electrode current collector on which the positive electrode material layer is loaded, and Mc is a carbon content (%) of the positive electrode material layer;

and the lithium-ion secondary battery satisfies $0.34 \leq k2/k1 \leq 8$.

By using the electrolyte solution comprising a highly heat-stable salt $(M^{p+})_{x/y}R_1(SO_2N^-)_xSO_2R_2$ and making the content of the highly heat-stable salt $(M^{p+})_{x/y}(R_1SO_2N)_xSO_2R_2$ and the positive electrode material load and carbon content of the positive electrode sheet satisfy a particular relationship, the impact of high temperature on the electrolyte solution can be reduced while improving the volumetric energy density of the battery cell, thereby achieving better battery cell performance and solving the problem that it is difficult to achieve both high energy density and long life.

In any embodiment, the lithium-ion secondary battery satisfies at least one of the following conditions 1) to 3):

$3.3 \leq k1 \leq 14.5$;  1)

$0.48 \leq k2/k1 \leq 7$; and  2)

$1 \leq Mc \leq 7$.  3)

By satisfying at least one of the above conditions 1) to 3), the energy density and/or charging and discharging performance and/or cycle life of the battery can be further improved.

In any embodiment, the $M^{p+}$ is at least one selected from the group consisting of $Li^+$, $Na^+$, $K^+$, $Rb^+$, $Cs^+$, $Mg^{2+}$, $Ba^{2+}$, $Al^{3+}$, $Fe^{2+}$, $Fe^{3+}$, $Ni^{2+}$, and $Ni^{3+}$, and optionally, the $M^{p+}$ is at least one selected from the group consisting of $Li^+$, $Na^+$, $K^+$, $Rb^+$, and $Cs^+$. By selecting the above-mentioned cations, the power performance of the battery cell can be further improved.

In any embodiment, the $R_1$ and $R_2$ are each independently a fluorine atom, an alkyl with 1-10 carbon atoms, a fluoroalkyl with 1-10 carbon atoms, or a fluoroalkoxy with 1-10 carbon atoms, and optionally, the $R_1$ and $R_2$ are each independently $CH_3$, $CF_3$, or F. By selecting the structures of $R_1$ and $R_2$, the improvement of cycling performance of the battery can be facilitated.

In any embodiment, the electrolyte solution of the lithium-ion secondary battery further comprises a low-impedance additive, and optionally, the low-impedance additive is at least one of fluorosulfonate $NSO_3F$, difluoro(oxalato)borate NDFOB, difluorophosphate $NPO_2F_2$, difluorodioxalate NDFOP, tris(trimethyl silyl)phosphate, and tris(trimethylsilyl)phosphite, where N is a metal ion of a salt, e.g., optionally, $Li^+$, $Na^+$, $K^+$, $Rb^+$, or $Cs^+$; and optionally, the low-impedance additive is at least one of lithium fluorosulfonate, lithium difluoro(oxalato)borate, tris (trimethylsilyl)phosphate, and lithium difluorophosphate. These low-impedance additives can reduce the impedance of the protective film (SEI film) on the surface of the positive and negative electrode sheets, and reduce the deterioration of battery performance caused by temperature rise.

In any embodiment, a mass percent of the low-impedance additive in the electrolyte solution is from 0.1% to 10%, and is optionally from 0.2% to 5%. By selecting the mass percent of the low-impedance additives, the cycling performance of the battery can be further improved.

In any embodiment, the electrolyte solution of the lithium-ion secondary battery further comprises a lithium salt that inhibits aluminum foil corrosion, and optionally, the lithium salt that inhibits aluminum foil corrosion is at least one selected from the group consisting of $LiPF_6$, $LiAsF_6$, and $LiBF_4$. By adding the lithium salt that inhibits aluminum foil corrosion, aluminum foil corrosion can be inhibited, and the temperature rise within the battery cell can be reduced.

In any embodiment, a mass percent of the lithium salt that inhibits aluminum foil corrosion in the electrolyte solution is from 0.1% to 10%, optionally from 0.2% to 5%, and optionally from 1% to 3%. By selecting the content of the lithium salt that inhibits aluminum foil corrosion, the cycling performance of the battery can be further improved.

In any embodiment, a total lithium salt content in the electrolyte solution of the lithium-ion secondary battery is in a range from 5 wt % to 50 wt %, optionally in a range from 5 wt % to 37 wt %, and optionally in a range from 5 wt % to 23 wt %, based on a total weight of the electrolyte solution. By selecting the total lithium salt content in the electrolyte solution, the cycle life and power performance of the lithium-ion secondary battery can be improved.

In any embodiment, the positive electrode active material in the lithium-ion secondary battery is one or more selected from the group consisting of a lithium transition metal oxide, an olivine-structured lithium-containing phosphate, and their respective modified compounds, and optionally, the lithium transition metal oxide is one or more selected from the group consisting of lithium-cobalt oxide, lithium-nickel oxide, lithium-manganese oxide, lithium-nickel-cobalt oxide, lithium-manganese-cobalt oxide, lithium-nickel-manganese oxide, lithium-nickel-cobalt-manganese oxide $LiNi_aCo_bMn_cO_2$ satisfying $a+b+c=1$ and $a<0.8$, lithium-nickel-cobalt-aluminum oxide, and modified compounds thereof.

A second aspect of the present application provides a battery module which comprises the lithium-ion secondary battery in the first aspect of the present application.

A third aspect of the present application provides a battery pack which comprises the battery module in the second aspect of the present application.

A fourth aspect of the present application provides a powered device which comprises one or more than of the lithium-ion secondary battery in the first aspect of the present application, the battery module in the second aspect of the present application, or the battery pack in the third aspect of the present application.

BRIEF DESCRIPTION OF DRAWINGS

In order to more clearly illustrate the technical solutions of the present application, the accompanying drawings to be used in embodiments of the present application will be briefly introduced below. Apparently, the drawings described below are merely some embodiments of the present application. For those of ordinary skills in the art, other drawings may also be obtained based on these drawings without making creative work.

DESCRIPTION OF REFERENCE NUMERALS

Figure 1:
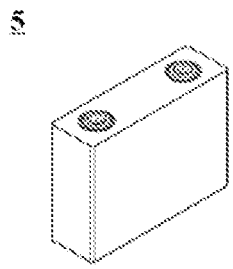
FIG. 1 is a schematic diagram of a lithium-ion secondary battery in an embodiment of the present application.

1: Battery pack
2: Upper box
3: Lower box
4: Battery module
5: Lithium-ion secondary battery
51: Case
52: Electrode assembly
53: Cover plate

DETAILED DESCRIPTION

For simplicity, the present application specifically discloses some value ranges. However, any lower limit may be combined with any upper limit to form an unspecified range; and any lower limit may be combined with other lower limits to form an unspecified range. Likewise, any upper limit may be combined with any other upper limit to form an unspecified range. Further, each individually disclosed point or single value itself may serve as a lower limit or upper limit in combination with any other point or single value or with other lower limits or upper limits to form an unspecified range.

Lithium-Ion Secondary Battery

In general, a lithium-ion secondary battery comprises a positive electrode sheet, a negative electrode sheet, a separator, and an electrolyte. In charging and discharging processes of the battery, active ions are intercalated and deintercalated back and forth between the positive electrode sheet and the negative electrode sheet. The separator is arranged between the positive electrode sheet and the negative electrode sheet, and plays the role of isolation. The electrolyte plays the role of conducting ions between the positive electrode sheet and the negative electrode sheet.

The lithium-ion secondary battery in the first aspect of the present application has a positive electrode sheet, a negative electrode sheet, a separator, and an electrolyte solution, the positive electrode sheet comprises a positive electrode current collector and a positive electrode material layer arranged on at least one surface of the positive electrode current collector, and the positive electrode material layer comprises a positive electrode active material and carbon, where the electrolyte solution comprises a lithium salt $(M^{p+})_{x/y}R_1(SO_2N^-)_xSO_2R_2$, which has a structural formula as follows:

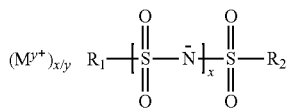

where the $M^{p+}$ is a metal ion, $R_1$ and $R_2$ are each independently a fluorine atom, an alkyl with 1-20 carbon atoms, a fluoroalkyl with 1-20 carbon atoms, or a fluoroalkoxy with 1-20 carton atoms, the x is 1, 2, or 3, they is 1, 2, or 3; and a mass percent of the lithium salt in the electrolyte solution is set as k2%;

a temperature rise coefficient k1 of the positive electrode sheet satisfies 2.5≤k1≤32, where k1=Cw/Mc, Cw is a positive electrode material load per unit area (mg/cm²) on the surface of any side of the positive electrode current collector on which the positive electrode material layer is loaded, and Mc is a carbon content (%) of the positive electrode material layer;

and the lithium-ion secondary battery satisfies 0.34≤k2/k1≤8.

The carbon comprised in the positive electrode material layer includes carbon coated on the surface of the positive electrode active material and carbon as a conductive agent optionally comprised in a positive electrode slurry used for preparing the positive electrode material layer.

In the charging process, temperature rise within a battery cell mainly comes from temperature rise of the positive electrode sheet, and temperature rise of the positive electrode sheet is mainly related to the thickness and conductivity of the positive electrode sheet. The thickness of the positive electrode sheet is related to Cw that is a positive electrode material load per unit area on the surface of any side of the positive electrode current collector on which the positive electrode material layer is loaded, and the conductivity of the positive electrode sheet is related to Mc that is a carbon content of the positive electrode material layer. Therefore, a temperature rise coefficient of the positive electrode sheet is defined as k1=Cw/Mc. When the charging current is constant, heat production within a battery cell is substantially positively correlated with the temperature rise coefficient k1. If k1 is too small, the positive electrode material load is too low, the carbon content of the positive electrode material layer is too high, and the proportion of an inactive substrate is large, thereby affecting the reduction of the energy density of the battery; while if k1 is too large, heat production of a battery cell is too high, the positive electrode material load is too high, and the carbon content of the positive electrode material layer is too low, which will result in a low solid-phase transmission rate of lithium ions and deteriorate the charging and discharging performance of the battery.

In addition, by adding highly heat-stable $(M^{p+})_{x/y}R_1(SO_2N)_xSO_2R_2$ into the electrolyte solution, the thermal resistance coefficient of the electrolyte solution can be significantly improved, and the decomposition of the electrolyte solution at high temperature can be reduced, such that the battery has a long cycle life. However, the inventor found in researches that when the concentration of the highly heat-stable salt is too high, the viscosity of the electrolyte solution will be increased, the conductivity of the electrolyte solution will be deteriorated, and then the internal resistance of the battery cell will be increased; while when the salt concentration is too low, the electrolyte solution will have insufficient thermal stability and may decompose at high temperature, thereby shortening the life of the battery cell. In addition, the inventor further found that the relationship between the mass percent k2 of the highly heat-stable salt $(M^{p+})_{x/y}R_1(SO_2N)_xSO_2R_2$ in the electrolyte solution and the temperature rise coefficient k1 of the positive electrode sheet has a great influence on the cycle life of the battery. When the k2 and the k1 satisfy the above relationship, sufficient thermal stability of the electrolyte solution can be ensured while ensuring that the battery has a high energy density, thereby inhibiting the decomposition of the electrolyte solution and ensuring that the battery has a long cycle life.

In some embodiments, the lithium-ion secondary battery satisfies: 3.3≤k1≤14.5. By further selecting the k1 value, the energy density and/or charging and discharging performance of the battery can be further improved.

In some embodiments, the lithium-ion secondary battery satisfies: 0.48≤k2/k1≤7. By further selecting the k2/k1 value, the cycle life of the battery can be further improved.

In some embodiments, the lithium-ion secondary battery satisfies: 1%≤Mc %≤7%, and optionally, the lithium-ion secondary battery satisfies: 1%<Mc %≤5%. If the carbon content is too high, the following circumstances may be caused: the proportion of the positive electrode active material per unit volume is low, thereby reducing the energy density of the battery, and the surface area of the positive electrode material will be made too large, so that it is easy to absorb water and agglomerate, which makes it difficult to machine the electrode sheet; while if the carbon content is too low, the following circumstances may be caused: the conductivity of the electrode sheet becomes poor, and lithium plating may occur in the charging process, thereby affecting the cycle life of the battery and bringing safety risks.

In some embodiments, the lithium-ion secondary battery satisfies: 18≤Cw≤32. If the positive electrode material load Cw is too low, a large proportion of an inactive substrate (such as a current collector) may be caused, thereby reducing the energy density; while if the Cw is too large, it may make the coating more difficult, and a transmission path of lithium ions in a direction perpendicular to the electrode sheet may be greatly increased, such that it is difficult for lithium ions to be quickly deintercalated from and intercalated into the active material, thereby affecting the power performance of the battery cell.

In some embodiments, the $M^{p+}$ is at least one selected from the group consisting of $Li^+$, $Na^+$, $K^+$, $Rb^+$, $Cs^+$, $Mg^{2+}$, $Ba^{2+}$, $Al^{3+}$, $Fe^{2+}$, $Fe^{3+}$, $Ni^{2+}$, and $Ni^{3+}$, and optionally, the $M^{p+}$ is at least one selected from the group consisting of $Li^+$, $Na^+$, $K^+$, $Rb^+$, and $Cs^+$. The transport number of the above cations is larger, such that the battery cell has better power performance.

In some embodiments, the $R_1$ and $R_2$ are each independently a fluorine atom, an alkyl with 1-10 carbon atoms, a fluoroalkyl with 1-10 carbon atoms, or a fluoroalkoxy with 1-10 carbon atoms, and optionally, the $R_1$ and $R_2$ are each independently $CH_3$, $CF_3$, or F. By selecting the structures of $R_1$ and $R_2$, the transport number of lithium ions can be increased and the lithium ions can be dissociated more easily, and the viscosity of the electrolyte solution is small such that the conductivity of the electrolyte solution is high, thereby contributing to improving the cycling performance of the battery.

In some embodiments, the electrolyte solution further comprises a low-impedance additive, and optionally, the low-impedance additive is at least one of NSO$_3$F (fluorosulfonate), NDFOB (difluoro(oxalato)borate), NPO$_2$F$_2$ (difluorophosphate), NDFOP (difluorodioxalate), tris(trimethylsilyl)phosphate, or tris(trimethylsilyl)phosphite, where N is a metal ion of a salt, e.g., optionally, Li$^+$, Na$^+$, K$^+$, Rb$^+$, or Cs$^+$. Optionally, the low-impedance additive is at least one of LiSO$_3$F (lithium fluorosulfonate), LiDFOB (lithium difluoro(oxalato)borate), tris(trimethyl silyl)phosphate, and LiPO$_2$F$_2$ (lithium difluorophosphate). Optionally, a mass percent of the low-impedance additive in the electrolyte solution is from 0.1% to 10%, and optionally from 0.2% to 5%. In addition to the temperature rise of the positive electrode sheet, the impedance of a protective film (SEI film) on the surface of the positive electrode sheet and the negative electrode sheet also has a great influence on the temperature rise within the battery cell, and the increase in the impedance value of the SEI film will further result in temperature rise of the battery cell in the charging process. Without wishing to be bound by theory, the low-impedance additive can be reduced on the surface of the negative electrode prior to an electrolyte solvent in a chemical formation process, forming a dense protective film with very low impedance on the surface of the negative electrode, thus inhibiting the reductive decomposition of the solvent and other high-impedance additives in the electrolyte solution on the surface of the negative electrode, thereby reducing the impedance of the SEI film. In addition, when the content of the low-impedance additive is within the above range, the viscosity of the electrolyte solution will not increase, and the conductivity of the electrolyte solution can be maintained.

In some embodiments, the electrolyte solution further comprises a lithium salt that inhibits aluminum foil corrosion, and optionally, the lithium salt that inhibits aluminum foil corrosion is at least one selected from the group consisting of LiPF$_6$, LiAsF$_6$, and LiBF$_4$. Optionally, a mass percent of the lithium salt that inhibits aluminum foil corrosion in the electrolyte solution is from 0.1% to 10%, optionally from 0.2% to 5%, and optionally from 1% to 3%. The lithium salt that inhibits aluminum foil corrosion may inhibit aluminum foil corrosion, thereby inhibiting the increase in the impedance of an aluminum current collector, reducing the temperature rise within the battery cell, and improving the safety performance of the battery cell. When the content of the lithium salt that inhibits aluminum foil corrosion is within the above range, aluminum foil corrosion can be inhibited, and the high temperature resistance of the electrolyte solution will not be adversely affected.

In some embodiments, a total lithium salt content in the electrolyte solution is in a range from 5 wt % to 50 wt %, optionally in a range from 5 wt % to 37 wt %, and optionally in a range from 5 wt % to 23 wt %, based on a total weight of the electrolyte solution. By selecting the total lithium salt content in the electrolyte solution, the cycle life and power performance of the lithium-ion secondary battery can be improved.

In some embodiments, the positive electrode active material is one or more selected from the group consisting of a lithium transition metal oxide, an olivine-structured lithium-containing phosphate, and their respective modified compounds. Examples of the lithium transition metal oxide may include, but are not limited to, one or more of lithium-cobalt oxide, lithium-nickel oxide, lithium-manganese oxide, lithium-nickel-cobalt oxide, lithium-manganese-cobalt oxide, lithium-nickel-manganese oxide, lithium-nickel-cobalt-manganese oxide LiNi$_a$Co$_b$Mn$_c$O$_2$ (a+b+c=1, a<0.8), lithium-nickel-cobalt-aluminum oxide, and modified compounds thereof. Examples of the olivine-structured lithium-containing phosphate may include, but are not limited to, one or more of lithium iron phosphate, composites of lithium iron phosphate and carbon, lithium manganese phosphate, composites of lithium manganese phosphate and carbon, lithium manganese iron phosphate, composites of lithium manganese iron phosphate and carbon, and modified compounds thereof. These materials are all commercially available. Carbon may be coated on the surface of the positive electrode active material.

In the present application, the carbon content Mc of the positive electrode material layer may be measured using an apparatus and a method known in the art. For example, the carbon content may be measured using an infrared absorption method after the positive electrode material layer on the positive electrode current collector is scraped off, e.g., by referring to GB/T20123-2006—Determination of total carbon and sulfur content in steel—Infrared absorption method after combustion in high-frequency induction furnace.

[Electrolyte Solution]

The electrolyte solution serves for conducting ions between the positive electrode sheet and the negative electrode sheet. The electrolyte solution comprises an electrolyte salt and a solvent.

In the present application, the electrolyte salt may be an electrolyte salt that is commonly used in lithium-ion secondary batteries, such as lithium salt, including the above lithium salt as a highly heat-stable salt, a lithium salt as a low-impedance additive, or a lithium salt that inhibits aluminum foil corrosion. As an example, the electrolyte salt may be one or more selected from the group consisting of LiPF$_6$ (lithium hexafluorophosphate), LiBF$_4$ (lithium tetrafluoroborate), LiAsF$_6$ (lithium hexafluoroarsenate), LiFSI (lithium bis(fluorosulfonyl)imide), LiTFSI (lithium bis(trifluoromethanesulfonyl)imide), LiTFS (lithium trifluoromethanesulfonate), LiDFOB (lithium difluoro(oxalato) borate), LiPO$_2$F$_2$ (lithium difluorophosphate), LiDFOP (lithium difluoro bis(oxalato)phosphate), LiSO$_3$F (lithium fluorosulfonate), NDFOP (difluorodioxalate), Li$_2$F(SO$_2$N)$_2$SO$_2$F, KFSI, CsFSI, Ba(FSI)$_2$, and LiFSO$_2$NSO$_2$CH$_2$CH$_2$CF$_3$.

The type of the solvent is not particularly limited and may be selected based on actual requirements. In some embodiments, the solvent is a non-aqueous solvent. Optionally, the solvent may comprise one or more of a chain carbonate, a cyclic carbonate, and a carboxylate. In some embodiments, the solvent may be one or more selected from the group consisting of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetrahydrofuran, sulfolane (SF), dimethyl sulfone (MSM), methyl ethyl sulfone (EMS), and diethyl sulfone (ESE).

In some embodiments, the electrolyte solution may further optionally comprise other additives. For example, the additives may include a negative electrode film-forming additive, or may include a positive electrode film-forming additive, or may further include an additive that can improve some performance of the battery, such as an additive that improves overcharge performance of the battery, an additive that improves high temperature performance of the battery, and an additive that improves low temperature performance of the battery. As an example, the additive is at least one selected from the group consisting of an unsaturated bond-containing cyclic carbonate compound, a halogen-substituted cyclic carbonate compound, a sulfate compound, a sulfite compound, a sultone compound, a disulfonic acid compound, a nitrile compound, an aromatic compound, an isocyanate compound, a phosphazene compound, a cyclic anhydride compound, a phosphite compound, a phosphate compound, a borate compound, and a carboxylate compound.

[Positive Electrode Sheet]

The positive electrode sheet comprises a positive electrode current collector and a positive electrode material layer arranged on at least one surface of the positive electrode current collector, and the positive electrode material layer comprises a positive electrode active material and carbon.

As an example, the positive electrode current collector has two opposite surfaces in its own thickness direction, and the positive electrode material layer is arranged on either one or both of the two opposite surfaces of the positive electrode current collector.

In the lithium-ion secondary battery of the present application, the positive electrode current collector may be a metal foil or a composite current collector. For example, an aluminum foil may be used as the metal foil. The composite current collector may comprise a high molecular material substrate layer and a metal layer formed on at least one surface of the high molecular material substrate layer. The composite current collector may be formed by forming a metal material (such as aluminum, aluminum alloy, nickel, nickel alloy, titanium, titanium alloy, silver, or silver alloy) on a high molecular material substrate (substrates such as polypropylene (PP), polyethylene terephthalate (PET), polybutylene terephthalate (PBT), polystyrene (PS), or polyethylene (PE)).

The positive electrode material layer optionally comprises a conductive agent. However, the type of the conductive agent is not specifically limited and may be selected by those skilled in the art based on actual requirements. As an example, the conductive agent for the positive electrode material may be one or more selected from the group consisting of superconducting carbon, acetylene black, carbon black, Ketjen black, carbon dot, carbon nanotube, graphene, and carbon nanofiber.

The positive electrode material layer further optionally comprises a binder. As an example, the binder may be one or more of styrene butadiene rubber (SBR), water-based acrylic resin, polyvinylidene fluoride (PVDF), polytetrafluoroethylene (PTFE), ethylene-vinyl acetate copolymer (EVA), polyacrylic acid (PAA), carboxymethyl cellulose (CMC), polyvinyl alcohol (PVA), and polyvinyl butyral (PVB).

In the present application, the positive electrode sheet may be prepared in accordance with a method known in the art. As an example, a carbon-coated positive electrode active material, a conductive agent, and a binder may be dispersed in a solvent (such as N-methylpyrrolidone (NMP)) to form a uniform positive electrode slurry; and the positive electrode slurry is coated on a positive electrode current collector, oven-dried, and cold pressed to obtain a positive electrode sheet.

[Negative Electrode Sheet]

The negative electrode sheet comprises a negative electrode current collector and a negative electrode material layer arranged on at least one surface of the negative electrode current collector, and the negative electrode material layer comprises a negative electrode active material.

As an example, the negative electrode current collector has two opposite surfaces in its own thickness direction, and the negative electrode material layer is arranged on either one or both of the two opposite surfaces of the negative electrode current collector.

In the lithium-ion secondary battery of the present application, the negative electrode current collector may be a metal foil or a composite current collector. For example, a copper foil may be used as the metal foil. The composite current collector may comprise a high molecular material substrate layer and a metal layer formed on at least one surface of the high molecular material substrate. The composite current collector may be formed by forming a metal material (such as copper, copper alloy, nickel, nickel alloy, titanium, titanium alloy, silver, or silver alloy) on a high molecular material substrate (substrates such as polypropylene (PP), polyethylene terephthalate (PET), polybutylene terephthalate (PBT), polystyrene (PS), or polyethylene (PE)).

In the lithium-ion secondary battery of the present application, the negative electrode material layer generally comprises a negative electrode active material and an optional binder, an optional conductive agent, and other optional adjuvants, and is generally obtained by coating and drying a negative electrode slurry. The negative electrode slurry is generally formed by dispersing the negative electrode active material and the optional conductive agent and binder in a solvent, and uniformly stirring the mixture. The solvent may be N-methylpyrrolidone (NMP) or deionized water.

The specific type of the negative electrode active material is not limited, an active material that is known in the art and can be used for the negative electrode of lithium-ion secondary batteries can be used, and those skilled in the art can choose it according to actual requirements. As an example, the negative electrode active material may be one or more selected from the group consisting of graphite, soft carbon, hard carbon, mesocarbon microsphere, carbon fiber, carbon nanotube, elementary silicon, silicon oxide, silicon carbon composite, and lithium titanate.

As an example, the conductive agent may be one or more selected from the group consisting of superconducting carbon, acetylene black, carbon black, Ketjen black, carbon dot, carbon nanotube, graphene, and carbon nanofiber.

As an example, the binder may be one or more selected from the group consisting of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

Other optional adjuvants are, for example, a thickener (such as sodium carboxymethylcellulose (CMC-Na)).

[Separator]

The lithium-ion secondary battery using an electrolyte solution further comprises a separator. The separator is arranged between the positive electrode sheet and the negative electrode sheet, and plays the role of isolation. The type of the separator is not particularly limited in the present application, and any well-known separator with a porous structure having good chemical stability and mechanical stability may be selected. In some embodiments, the material of the separator may be one or more selected from the group consisting of glass fiber, non-woven cloth, polyethylene, polypropylene, and polyvinylidene fluoride. The separator may be a single-layer film or a multi-layer composite film, which is not particularly limited. When the separator is a multi-layer composite film, the materials in various layers may be identical or different, which is not particularly limited.

In some embodiments, the positive electrode sheet, the negative electrode sheet, and the separator may be made into an electrode assembly by a winding process or a lamination process.

In some embodiments, the lithium-ion secondary battery may comprise an outer package. The outer package may be used for encapsulating the above electrode assembly and electrolyte.

In some embodiments, the outer package of the lithium-ion secondary battery may be a hard case, such as a hard plastic case, an aluminum case, and a steel case. The outer package of the lithium-ion secondary battery may also be a soft package, such as a bag-type soft package. The material of the soft package may be plastic, and examples of plastic include polypropylene (PP), polybutylene terephthalate (PBT), polybutylene succinate (PBS), and the like.

The shape of the lithium-ion secondary battery is not particularly limited in the present application, and it may be cylindrical, square, or any other shape. For example, FIG. 1 is a lithium-ion secondary battery 5 of a square structure as an example.

Figure 2:
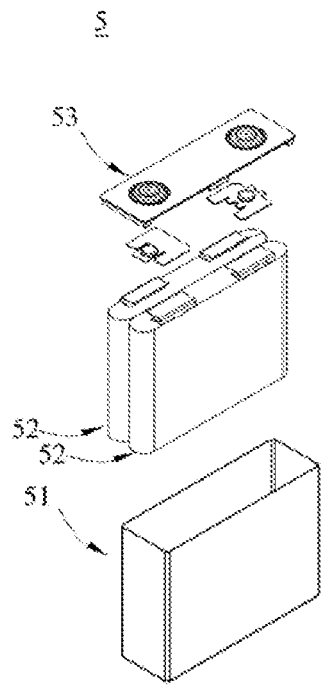
FIG. 2 is an exploded view of the lithium-ion secondary battery in an embodiment of the present application shown in FIG. 1.

In some embodiments, referring to FIG. 2, the outer package may comprise a case 51 and a cover plate 53. The case 51 may comprise a bottom plate and a side plate connected to the bottom plate, with the bottom plate and the side plate enclosing to form an accommodating cavity. The case 51 has an opening that communicates with the accommodating cavity, and the cover plate 53 can cover the opening to close the accommodating cavity. The positive electrode sheet, the negative electrode sheet, and the separator may form an electrode assembly 52 by a winding process or a lamination process. The electrode assembly 52 is packaged within the accommodating cavity. The electrolyte solution is infiltrated in the electrode assembly 52. The number of electrode assemblies 52 comprised in the lithium-ion secondary battery 5 may be one or more, and it may be selected by those skilled in the art based on specific actual requirements.

In some embodiments, the lithium-ion secondary batteries may be assembled into a battery module, the number of lithium-ion secondary batteries comprised in the battery module may be one or more, and the specific number may be selected by those skilled in the art based on the application and capacity of the battery module.

Figure 3:
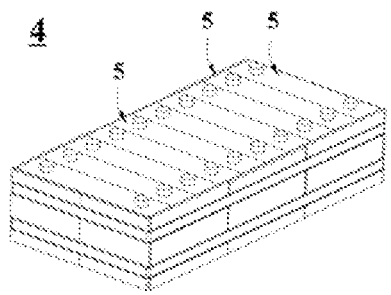
FIG. 3 is a schematic diagram of a battery module in an embodiment of the present application.

FIG. 3 is a battery module 4 as an example. Referring to FIG. 3, in the battery module 4, a plurality of lithium-ion secondary batteries 5 may be arranged successively along a length direction of the battery module 4. Of course, they may also be arranged in any other manner. Further, the plurality of lithium-ion secondary batteries 5 may be fixed using fasteners.

Optionally, the battery module 4 may further comprise a case having an accommodating space in which the plurality of lithium-ion secondary batteries 5 is accommodated.

In some embodiments, the above battery module may further be assembled into a battery pack, and the number of battery modules comprised in the battery pack may be selected by those skilled in the art based on the application and capacity of the battery pack.

Figure 4:
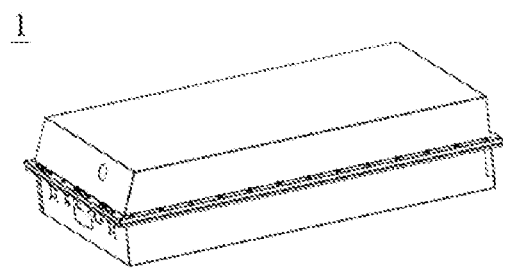
FIG. 4 is a schematic diagram of a battery pack in an embodiment of the present application.
Figure 5:
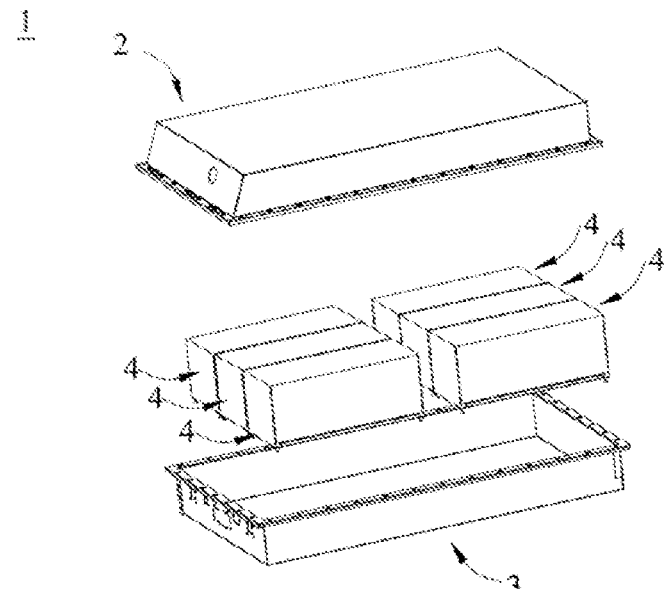
FIG. 5 is an exploded view of the battery pack in an embodiment of the present application shown in FIG. 4.

FIG. 4 and FIG. 5 are a battery pack 1 as an example. Referring to FIG. 4 and FIG. 5, the battery pack 1 may comprise a battery box and a plurality of battery modules 4 arranged in the battery box. The battery box comprises an upper box 2 and a lower box 3. The upper box 2 can cover the lower box 3 and form an enclosed space for accommodating the battery modules 4. The plurality of battery modules 4 may be arranged in the battery box in any manner.

Further, the present application further provides a device comprising one or more of the lithium-ion secondary battery, the battery module, or the battery pack provided in the present application. The lithium-ion secondary battery, the battery module, or the battery pack may be used as a power source of the device, or may be used as an energy storage unit of the device. The device may be, but is not limited to, a mobile device (e.g., a mobile phone and a laptop), an electric vehicle (e.g., an all-electric vehicle, a hybrid electric vehicle, a plug-in hybrid electric vehicle, an electric bicycle, an electric scooter, an electric golf cart, and an electric truck), an electric train, a ship and a satellite, an energy storage system, and the like.

The lithium-ion secondary battery, the battery module, or the battery pack may be selected based on the use demand of the device.

Figure 6:
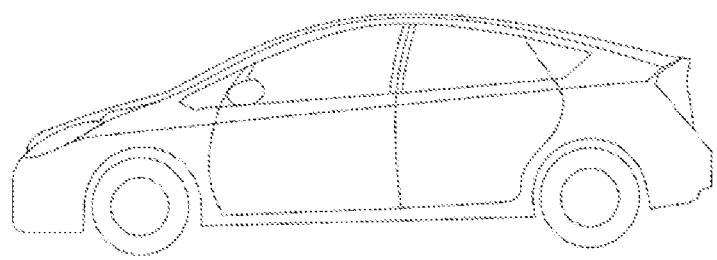
FIG. 6 is a schematic diagram of a device in which a lithium-ion secondary battery in an embodiment of the present application is used as a power source.

FIG. 6 is a device as an example. The device is an all-electric vehicle, a hybrid electric vehicle, a plug-in hybrid electric vehicle, or the like. In order to meet the requirements of the device for high power and high energy density of a lithium-ion secondary battery, a battery pack or a battery module may be employed.

As another example, the device may be a mobile phone, a tablet computer, a notebook computer, or the like. The device is generally required to be thin and light, and may be powered by lithium-ion secondary batteries.

EXAMPLES

Examples of the present application are illustrated below. The examples described below are illustrative, are merely used to explain the present application, and should not be construed as a limitation to the present application. If no specific technique or condition is indicated in an example, a technique or condition described in the literature in the art or the product specification is followed. The reagents or instruments used without indication of manufacturers are commercially available conventional products.

1. Preparation of Lithium-Ion Secondary Battery (1) Preparation of Positive Electrode Sheet Carbon-coated lithium iron phosphate (LFP) as a positive electrode active material, a conductive agent acetylene black, and a binder polyvinylidene fluoride (PVDF) were dissolved in a solvent N-methylpyrrolidone (NMP) at a weight ratio shown in Table 1. The mixture was uniformity mixed by sufficiently stirring to obtain a positive electrode slurry, where the used carbon-coated lithium iron phosphate has a carbon content shown in Table 1. Then, based on a Cw value to be reached, the positive electrode slurry was uniformly coated on an aluminum positive electrode current collector, which was then oven-dried, cold pressed, and slit to obtain the positive electrode sheet.

(2) Preparation of Negative Electrode Sheet

A negative electrode active material artificial graphite, a conductive agent acetylene black, a binder styrene butadiene rubber (SBR), and a thickener sodium carboxymethylcellulose (CMC-Na) were dissolved in a solvent deionized water at a weight ratio of 95:2:2:1, which was uniformly mixed to prepare a negative electrode slurry. Then, a negative electrode load was determined based on a corresponding Cw value of the positive electrode. The negative electrode slurry was uniformly coated on a negative electrode current collector copper foil based on a negative electrode load shown in Table 1, oven-dried, and then cold pressed and slit to obtain the negative electrode sheet.

TABLE 1

(Examples or comparative examples with identical parameter values were listed on the same line)

| No. | Negative electrode load (mg/cm$^2$) | Carbon content of carbon-coated LFP (wt %) | Weight ratio of carbon-coated LFP:conductive agent:PVDF |
|---|---|---|---|
| Comparative Example 1 | 7.48 | 3 | 95:3:2 |
| Comparative Examples 2-3 | 14.22 | 0 | 98.2:0.3:1.5 |
| Comparative Example 4 | 13.76 | 1.2 | 96:2:2 |
| Comparative Example 5 | 9.96 | 2.5 | 95:3:2 |
| Examples 1-3 | 13.76 | 1.2 | 96:2:2 |
| Example 4 | 10.10 | 2.5 | 95:3:2 |
| Example 5 | 9.96 | 2.5 | 95:3:2 |
| Example 6 | 13.14 | 2.8 | 95:3:2 |
| Example 7 | 14.12 | 0.2 | 98.2:0.3:1.5 |
| Examples 8-24 | 13.76 | 1.2 | 96:2:2 |
| Example 25 | 15.33 | 0.6 | 97:0.9:2.1 |

(3) Preparation of Electrolyte Solution

In a glove box under an argon atmosphere ($H_2O<0.1$ ppm, $O_2<0.1$ ppm), organic solvents EC/EMC were uniformly mixed at a volume ratio of 3/7. 3 wt % vinylene carbonate, a highly heat-stable salt at a weight percent shown in Table 2, and an optional additive were added. The mixture was uniformly stirred to obtain the corresponding electrolyte solution. The weight percent of the vinylene carbonate and the weight percent shown in Table 2 are based on a total weight of the resulting electrolyte solution.

(4) Preparation of Lithium-Ion Secondary Battery

The positive electrode sheet prepared in the above (1) and the negative electrode sheet prepared in the above (2) were used, and a polypropylene film was used as a separator. The positive electrode sheet, the separator, and the negative electrode sheet were stacked in order, such that the separator was between the positive electrode sheet and the negative electrode sheet for isolation, and then winded to obtain an electrode assembly. The electrode assembly was placed in a battery case, and dried. Then, an electrolyte solution was injected, then chemically formed, and left to stand still, to obtain the lithium-ion secondary battery.

2. Test of Lithium-Ion Secondary Battery (1) Test of Carbon Content of Positive Electrode Sheet Test instrument: high-frequency infrared carbon-sulfur analyzer, model HCS-140, commercially purchased from Shanghai Dekai Instruments Co., Ltd.

Referring to GB/T20123-2006—Determination of total carbon and sulfur content in steel—Infrared absorption method after combustion in high-frequency induction furnace (routine method). Test process: the positive electrode material layer on the positive electrode current collector was scraped off, and heated and burned in the above high-frequency furnace under oxygen-enriched conditions to oxidize carbon comprised in the material into carbon dioxide. The generated gas was treated and then introduced into a corresponding absorption cell to absorb corresponding infrared radiation, which is converted by a detector into a corresponding digital signal. The resulting digital signal was sampled by a computer, linearly corrected, converted into a value proportional to a carbon dioxide concentration, and accumulated to obtain an accumulated value. The resulting accumulated value was divided by a sample weight and then multiplied by a correction factor, and the blank was deducted to obtain the carbon percent content Mc (%) in the sample.

(2) Test of Cycling Performance of Lithium-Ion Secondary Battery at 45° C.

At 45° C., the lithium-ion secondary battery was charged to 3.65 V at a constant current of 1 C, then charged at a constant voltage of 3.65 V until the current was less than 0.05 C, and then discharged to 2.5 V at a constant current of 1 C, which was a charge-discharge process. The charging and discharging were repeated in this way, and the number of cycles when the capacity retention rate of the lithium-ion battery was 80% was calculated. The number of cycles at 45° C. in the examples and comparative examples is shown in Table 1.

(3) Test of Volumetric Energy Density

At 25° C., the lithium-ion battery was charged to 3.65 V at a constant current of 0.5 C, then charged at a constant voltage of 3.65 V until the current was less than 0.05 C, and then discharged to 2.5 V at 0.33 C, to obtain discharge energy Q. The length, width, and height of the battery cell were measured using a vernier caliper, to calculate the volume V and the volumetric energy density=Q/V Table 2 shows Mc, Cw, k1, k2, volumetric energy density, and 45° C. cycling performance of the lithium-ion batteries in the examples and comparative examples.

TABLE 2

| No. | Positive electrode material layer | | Temperature rise coefficient of electrode sheet k1 = Cw/Mc | Highly heat-stable salt | Mass percent | |
|---|---|---|---|---|---|---|
| | Carbon content Mc (%) | Load Cw (mg/cm$^2$) | | | k2 of highly heat-stable salt (%) | k2/k1 |
| Comparative Example 1 | 7.1 | 16.88 | 2.38 | / | 0 | 0 |
| Comparative Example 2 | 0.89 | 29.22 | 32.83 | / | 0 | 0 |
| Comparative Example 3 | 0.89 | 29.22 | 32.83 | LiFSI | 32 | 0.97 |
| Comparative Example 4 | 4 | 29.22 | 7.3 | LiFSI | 1.5 | 0.21 |
| Comparative Example 5 | 6.8 | 22 | 3.24 | LiFSI | 30 | 9.27 |
| Example 1 | 4 | 29.22 | 7.3 | LiFSI | 15.4 | 2.1 |
| Example 2 | 4 | 29.22 | 7.3 | LiFSI | 3.1 | 0.42 |
| Example 3 | 4 | 29.22 | 7.3 | LiFSI | 35.4 | 4.84 |
| Example 4 | 6.8 | 22.3 | 3.28 | LiFSI | 6.9 | 2.1 |
| Example 5 | 6.8 | 22 | 3.24 | LiFSI | 22.5 | 6.94 |
| Example 6 | 7 | 29.22 | 4.17 | LiFSI | 15.4 | 3.68 |

TABLE 2-continued

| | | | | | | |
|---|---|---|---|---|---|---|
| Example 7 | 1 | 29.22 | 29.22 | LiFSI | 15.4 | 0.53 |
| Example 8 | 4 | 27.27 | 6.82 | LiFSI | 15.4 | 2.25 |
| Example 9 | 4 | 27.27 | 6.82 | LiTFSI | 15.4 | 2.25 |
| Example 10 | 4 | 27.27 | 6.82 | $Li_2F(SO_2N)_2SO_2F$ | 15.4 | 2.25 |
| Example 11 | 4 | 27.27 | 6.82 | LiFSI + KFSI | 10 + 10 | 2.93 |
| Example 12 | 4 | 27.27 | 6.82 | LiFSI + CsFSI | 10 + 10 | 2.93 |
| Example 13 | 4 | 27.27 | 6.82 | LiFSI + $Ba(FSI)_2$ | 10 + 10 | 2.93 |
| Example 14 | 4 | 27.27 | 6.82 | LiFSI | 15.4 | 2.25 |
| Example 15 | 4 | 27.27 | 6.82 | LiFSI | 21.5 | 3.16 |
| Example 16 | 4 | 27.27 | 6.82 | LiFSI | 15.4 | 2.25 |
| Example 17 | 4 | 27.27 | 6.82 | LiFSI | 15.4 | 2.25 |
| Example 18 | 4 | 27.27 | 6.82 | LiFSI | 15.4 | 2.25 |
| Example 19 | 4 | 27.27 | 6.82 | LiFSI | 15.4 | 2.25 |
| Example 20 | 4 | 27.27 | 6.82 | LiFSI | 15.4 | 2.25 |
| Example 21 | 4 | 27.27 | 6.82 | LiFSI | 15.4 | 2.25 |
| Example 22 | 4 | 27.27 | 6.82 | LiFSI + $LiFSO_2NSO_2CH_2CH_2CF_3$ | 5 + 10.5 | 2.27 |
| Example 23 | 4 | 27.27 | 6.82 | LiFSI | 15.4 | 2.25 |
| Example 24 | 4 | 27.27 | 6.82 | LiFSI | 15.4 | 2.25 |
| Example 25 | 2.23 | 32 | 14.35 | LiFSI | 20 | 1.39 |

| No. | Low-impedance additive A | Content of A (%) | Lithium salt B that inhibits aluminum foil corrosion | Content of B (%) | Volumetric energy density (wh/L) | Number of cycles at 45° C. |
|---|---|---|---|---|---|---|
| Comparative Example 1 | / | / | $LiPF_6$ | 12.5 | 319.7 | 1812 |
| Comparative Example 2 | / | / | $LiPF_6$ | 12.5 | 434.9 | 369 |
| Comparative Example 3 | / | / | / | / | 434.9 | 623 |
| Comparative Example 4 | / | / | $LiPF_6$ | 11.5 | 420.2 | 1501 |
| Comparative Example 5 | / | / | / | / | 395.1 | 1427 |
| Example 1 | / | / | / | / | 420.2 | 2011 |
| Example 2 | / | / | $LiPF_6$ | 11.5 | 420.2 | 1750 |
| Example 3 | / | / | / | / | 409.6 | 1619 |
| Example 4 | / | / | $LiPF_6$ | 10 | 395.1 | 1921 |
| Example 5 | / | / | / | / | 395.1 | 1899 |
| Example 6 | / | / | / | / | 401.8 | 2004 |
| Example 7 | / | / | / | / | 424.3 | 1632 |
| Example 8 | Lithium fluorosulfonate | 1.5 | / | / | 414.8 | 2250 |
| Example 9 | Lithium fluorosulfonate | 1.5 | / | / | 414.8 | 2237 |
| Example 10 | Lithium fluorosulfonate | 1.5 | / | / | 414.8 | 2223 |
| Example 11 | Lithium fluorosulfonate | 1.5 | / | / | 414.8 | 2249 |
| Example 12 | Lithium fluorosulfonate | 1.5 | / | / | 414.8 | 2246 |
| Example 13 | Lithium fluorosulfonate | 1.5 | / | / | 414.8 | 2310 |
| Example 14 | Lithium fluorosulfonate + lithium difluoro(oxalato)borate | 1 + 0.5 | / | / | 414.8 | 2289 |
| Example 15 | Lithium fluorosulfonate + lithium difluoro(oxalato)borate | 1 + 0.5 | / | / | 414.8 | 2295 |
| Example 16 | Lithium fluorosulfonate + lithium difluoro(oxalato)borate | 1 + 0.5 | $LiPF_6$ | 2.5 | 414.8 | 2450 |
| Example 17 | Lithium fluorosulfonate + lithium difluoro(oxalato)borate | 1 + 0.5 | $LiPF_6$ | 0.1 | 414.8 | 2309 |
| Example 18 | Lithium fluorosulfonate + lithium difluoro(oxalato)borate | 1 + 0.5 | $LiPF_6$ | 10 | 414.8 | 2324 |

TABLE 2-continued

| | | | | | | |
|---|---|---|---|---|---|---|
| Example 19 | Lithium fluorosulfonate + lithium difluoro(oxalato)borate | 1 + 0.5 | LiPF$_6$ | 0.2 | 414.8 | 2357 |
| Example 20 | Lithium fluorosulfonate + lithium difluoro(oxalato)borate | 1 + 0.5 | LiPF$_6$ | 5 | 414.8 | 2363 |
| Example 21 | Lithium fluorosulfonate + lithium difluoro(oxalato)borate | 1 + 0.5 | LiAsF$_6$ | 2.5 | 414.8 | 2465 |
| Example 22 | Lithium fluorosulfonate | 1.5 | / | / | 414.8 | 2214 |
| Example 23 | Lithium fluorosulfonate | 5 | / | / | 414.7 | 2239 |
| Example 24 | Lithium fluorosulfonate | 9 | / | / | 414.7 | 2121 |
| Example 25 | / | / | / | / | 434 | 2039 |

As can be seen from Table 1, the k1 in Comparative Example 1 was too low, and accordingly, the energy density of the battery was low. In Comparative Examples 2 to 3, the load of the positive electrode material layer was increased, and the carbon content was decreased, such that the k1 was increased, and accordingly, the volumetric energy density of the battery was significantly improved, but too high k1 resulted in significant deterioration of the cycle life of the battery cell. In Comparative Example 3, even if a highly heat-stable salt was used and the k2/k1 value fell within the scope of the present application, the cycle life was still low. On the other hand, the k1 value in Comparative Examples 4-5 fell within the scope of the present application, but k2/k1 was too high or too low, such that the cycle life was low.

In contrast, in Examples 1-25, both an electrolyte solution comprising a highly stable lithium salt and a positive electrode sheet with a large load of the positive electrode material layer and with a low carbon content were used, such that the battery cell had both a high energy density and a long cycle life.

As can be seen from the comparison between Example 1 and Example 2, the k2/k1 value in Example 1 was in a range from 0.48 to 7, thus obtaining better cycling performance than Example 2. As can be seen from the comparison between Example 1 and Example 4, the k1 value in Example 1 was in a range from 3.3 to 14.5, thus obtaining better cycling performance than Example 4.

As can be seen from Examples 8-24, a low-impedance additive was added into the electrolyte solution, thereby further improving the cycle life of the battery while ensuring that the battery has a high energy density.

As can be seen from Examples 16-21, a lithium salt that inhibits aluminum foil corrosion was added into the electrolyte solution, which inhibits aluminum foil corrosion and reduces the increase in the impedance value of aluminum foil, thereby further improving the cycle life of the battery. Further, when the mass percent of the lithium salt that inhibits aluminum foil corrosion was in a range from 0.2% to 5% (Examples 16 and 19-20), the cycle life of the battery could be further improved.

While the present application has been described with reference to the examples, various modifications may be made and components thereof may be substituted with equivalents without departing from the scope of the present application. In particular, as long as there is no structural conflict, the technical features mentioned in the examples may be combined in any manner. The present discloses is not limited to the particular examples disclosed herein, but includes all technical solutions falling within the scope of the appended claims.

What is claimed is:

1. A lithium-ion secondary battery, comprising:
   a positive electrode sheet,
   a negative electrode sheet,
   a separator, and
   an electrolyte solution,
   wherein the positive electrode sheet comprises a positive electrode current collector, and a positive electrode material layer arranged on at least one surface of the positive electrode current collector, the positive electrode material layer comprising a positive electrode active material and carbon, wherein
   the electrolyte solution comprises a heat-stable salt and a low-impedance additive; and
   a chemical formula of the heat-stable salt is $(M^{p+})_{x/y}R_1(SO_2N^-)_xSO_2R_2$, wherein the $M^{p+}$ is a metal ion, $R_1$ and $R_2$ are each independently a fluorine atom, an alkyl with 1-20 carbon atoms, a fluoroalkyl with 1-20 carbon atoms, or a fluoroalkoxy with 1-20 carton atoms, the x is 1, 2, or 3, the y is 1, 2, or 3; and a mass percent of the heat-stable salt in the electrolyte solution is set as k2%;
   wherein a temperature rise coefficient of the positive electrode sheet k1=Cw/Mc, Cw is a positive electrode material load per unit area (mg/cm$^2$) on the surface of any side of the positive electrode current collector on which the positive electrode material layer is loaded, and Mc is a carbon content (wt %) of the positive electrode material layer, 18≤Cw≤30, 1≤Mc≤7;
   wherein the lithium-ion secondary battery satisfies 0.34≤k2/k1≤8; and
   wherein the low-impedance additive is
   a fluorosulfonate NSO$_3$F,
   wherein N is a metal ion of a salt.

2. The lithium-ion secondary battery according to claim 1, wherein the lithium-ion secondary battery satisfies at least one of the following conditions:

3.3≤k1≤14.5; and 0.48≤k2/k1≤7.

3. The lithium-ion secondary battery according to claim 1, wherein the $M^{p+}$ is at least one selected from the group consisting of Li$^+$, Na$^+$, K$^+$, Rb$^+$, Cs$^+$, Mg$^{2+}$, Ca$^{2+}$, Ba$^{2+}$, Al$^{3+}$, Fe$^{2+}$, Fe$^{3+}$, Ni$^{2+}$, and Ni$^{3+}$.

4. The lithium-ion secondary battery according to claim 1, wherein the $R_1$ and $R_2$ are each independently a fluorine atom, an alkyl with 1-10 carbon atoms, a fluoroalkyl with 1-10 carbon atoms, or a fluoroalkoxy with 1-10 carbon atoms.

5. The lithium-ion secondary battery according to claim 1, wherein a mass percent of the low-impedance additive in the electrolyte solution is from 0.1% to 10%.

6. The lithium-ion secondary battery according to claim 1, wherein the electrolyte solution further comprises a lithium salt, and the lithium salt is at least one selected from the group consisting of $LiPF_6$, $LiAsF_6$, and $LiBF_4$.

7. The lithium-ion secondary battery according to claim 6, wherein a mass percent of the lithium salt in the electrolyte solution is from 0.1% to 10%.

8. The lithium-ion secondary battery according to claim 6, wherein a total lithium salt content in the electrolyte solution is in a range from 5 wt % to 50 wt % based on a total weight of the electrolyte solution.

9. The lithium-ion secondary battery according to claim 1, wherein the positive electrode active material is one or more selected from the group consisting of a lithium transition metal oxide, an olivine-structured lithium-containing phosphate, and their respective modified compounds, wherein the lithium transition metal oxide is one or more selected from the group consisting of lithium-cobalt oxide, lithium-nickel oxide, lithium-manganese oxide, lithium-nickel-cobalt oxide, lithium-manganese-cobalt oxide, lithium-nickel-manganese oxide, lithium-nickel-cobalt-manganese oxide $LiNi_aCo_bMn_cO_2$ satisfying a+b+c=1 and a<0.8, lithium-nickel-cobalt-aluminum oxide, and modified compounds thereof.

10. A battery module comprising the lithium-ion secondary battery according to claim 1.

11. A battery pack comprising the battery module according to claim 10.

12. A powered device comprising one or more of the lithium-ion secondary battery according to claim 1.

* * * * *